(12) United States Patent
Moor et al.

(10) Patent No.: US 11,540,017 B1
(45) Date of Patent: Dec. 27, 2022

(54) SYSTEM AND METHOD FOR GENERATING MODELS REPRESENTING USERS OF A MEDIA PROVIDING SERVICE

(71) Applicant: Spotify AB, Stockholm (SE)

(72) Inventors: Dmitrii Moor, London (GB); Rishabh Mehrotra, London (GB); Mounia Lalmas-Roelleke, London (GB)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 17/325,049

(22) Filed: May 19, 2021

(51) Int. Cl.
*H04N 21/466* (2011.01)

(52) U.S. Cl.
CPC ....... *H04N 21/4663* (2013.01); *H04N 21/466* (2013.01); *H04N 21/4665* (2013.01); *H04N 21/4667* (2013.01); *H04N 21/4668* (2013.01)

(58) Field of Classification Search
CPC ............. H04N 21/4663; H04N 21/466; H04N 21/4665; H04N 21/4667; H04N 21/4668
USPC .......................................................... 725/46
See application file for complete search history.

(56) References Cited

U.S. PATENT DOCUMENTS

| | | | |
|---|---|---|---|
| 10,157,351 B1* | 12/2018 | Rastogi | G06F 3/0484 |
| 2010/0100416 A1* | 4/2010 | Herbrich | G06Q 30/0633 705/7.32 |
| 2012/0254289 A1 | 10/2012 | Sathish | |
| 2014/0075351 A1* | 3/2014 | Hansen | G06F 9/4451 715/765 |
| 2015/0058903 A1 | 2/2015 | Iyengar et al. | |
| 2015/0074022 A1* | 3/2015 | Cornelius | H04N 21/6371 706/12 |
| 2015/0120722 A1* | 4/2015 | Mart N Mart Nez | G06F 16/9535 707/733 |

(Continued)

FOREIGN PATENT DOCUMENTS

CN 102831234 B 4/2015

OTHER PUBLICATIONS

C. Shi et al., "Deep Collaborative Filtering with Multi-Aspect Information in Heterogeneous Networks," in IEEE Transactions on Knowledge and Data Engineering, vol. 33, No. 4, pp. 1413-1425, Apr. 1, 2021, doi: 10.1109/TKDE.2019.2941938. (Year: 2021).*

(Continued)

*Primary Examiner* — Cynthia M Fogg
(74) *Attorney, Agent, or Firm* — Morgan, Lewis & Bockius LLP (57) ABSTRACT

A method of recommending media items to a user is provided. The method includes receiving historical data for a user of a media providing service. The historical data indicates past interactions of the user with media items. The method includes generating a model of the user. The model includes a first set of parameters, each of the first set of parameters quantifying a predicted latent preference of the user for a respective media item provided by the media providing service. The method includes evaluating the predicted latent preferences of the user for the respective media items against the historical data indicating the past interactions of the user with the media items provided by the media providing service. The method includes selecting a recommender system from a plurality of recommender systems using the model of the user, including the first set of parameters. The method includes providing a media item to a second user using the selected recommender system.

16 Claims, 6 Drawing Sheets

(56) References Cited

U.S. PATENT DOCUMENTS

| | | | |
|---|---|---|---|
| 2015/0169705 A1* | 6/2015 | Korbecki | G06F 16/248 707/736 |
| 2016/0274744 A1* | 9/2016 | Neumann | H04N 21/252 |
| 2017/0161644 A1* | 6/2017 | Somekh | G06N 20/00 |
| 2018/0165590 A1* | 6/2018 | Vlassis | G06F 16/9535 |
| 2019/0114687 A1 | 4/2019 | Krishnamurthy et al. | |
| 2019/0222899 A1* | 7/2019 | Chen | H04N 21/251 |
| 2020/0143448 A1* | 5/2020 | Steck | G06Q 30/0643 |
| 2020/0394559 A1* | 12/2020 | Zhang | G06N 7/005 |
| 2021/0157664 A1* | 5/2021 | Panda | G06N 20/00 |
| 2021/0240970 A1* | 8/2021 | Mikawa | G06V 40/176 |

OTHER PUBLICATIONS

A. B. Suhaim and J. Berri, "Context-Aware Recommender Systems for Social Networks: Review, Challenges and Opportunities," in IEEE Access, vol. 9, pp. 57440-57463, 2021, doi: 10.1109/ACCESS. 2021.3072165. (Year: 2021).*

Basford, Creating a recommendation engine using Amazon Personalize, AWS Machine Learning Blog, Amazon Personalize, Artificial Intelligence, Jun. 13, 2019, from https://aws.amazon.com/blogs/machine-learning/creating-a-recommendation-engine-using-amazon-personalize/, 8 pgs.

Ben-Porat et al., A Game-Theoretic Approach to Recommendation Systems with Strategic Content Providers, 32nd Conference on Neural Information Processing Systems (NeurIPS 2018), Montreal, Canada, 11 pgs.

Chen et al., Top-K Off-Policy Correction for a Reinforce Recommender System, WSDM'19, Feb. 11-15, 2019, Melbourne, VIC, Australia, ACm Isbn 978-1-4503-5940-5/19/02, 9 pgs.

Chen et al., Will you "Reconsume" the Near Past? Fast Prediction on Short-Term Reconsumption Behaviors, Copyright © 2015, Association for the Advancement of Artificial Intelligence, 7 pgs.

Hallak et al., Contextual Markov Decision Processes, arXiv:1502. 02259v1 [stat.ML] Feb. 8, 2015, 13 pgs.

Ie et al., RecSim: A Configurable Simulation Platform for Recommender Systems, arXiv:1909.04847v2 [cs.LG] Sep. 26, 2019, 23 pgs.

Ie et al., SlateQ: A Tractable Decomposition for Reinforcement Learning with Recommendation Sets, Proceedings of the Twenty-Eight International Joint Conference on Artificial Intelligence (IJCAI-19), 8 pgs.

Machine English Translation of CN102831234B, Apr. 22, 2015, 58 pgs.

Mladenov et al., Optimizing Long-term Social Welfare in Recommender Systems: A Constrained Matching Approach, Proceedings of the 37th International Conference on Machine Learning, Vienna, Austria, PMLR 119, 2020, Copyright 2020 by the authors, 11 pgs.

Sarwar et al., Item-Based Collaborative Filtering Recommendation Algorithms, WWW10, May 1-5, 2001, Hong Kong, ACM 1-58113-348-0/01/0005, 11 pgs.

Shani et al., An MDP-Based Recommender System, Journal of Machine Learnng Research 6 (2005) pp. 1265-1295, Published Sep. 2005, 31 pgs.

Su et al., A Survey of Collaborative Filtering Techniques, Hindawi Pblishing Corporation, Advances in Artificial Intelligence, vol. 2009, Artilce ID 421425, doi:10.1155/2009/421425, 20 pgs.

Wu et al., A Context-Aware User-Item Representation Learning for Item Recommendation, IEEE Transactions on Knowledge and Data Engineering, Submission 2017, ar.Xiv:1712.0232.5 [cs.IR], Dec. 29, 2017, 14 pgs.

* cited by examiner

Receive (502) historical data for a user of a media providing service, the historical data indicates past interactions of the user with media items provided by the media providing service.

The historical data comprises (504) historical data for a plurality of listening sessions.

The past interactions of the user comprise (506) one or more interactions from the group consisting of: listening to a respective media item, skipping a respective media item, and ending a listening session.

Generate (508) a model of the user, the model comprising a first set of parameters, each of the first set of parameters quantifying a predicted latent preference of the user for a respective media item provided by the media providing service, the generating including evaluating the predicted latent preferences of the user for the respective media items against the historical data indicating the past interactions of the user with the media items provided by the media providing service.

Evaluating the predicted latent preferences of the user against the historical data indicating the past interactions of the user comprises retrospectively predicting (510) the past interactions of the user using the predicted latent preferences and comparing the retrospectively predicted past interactions of the user to the historical data indicating the past interactions of the user.

Retrospectively predicting the past interactions of the user comprises retrospectively predicting (512) the past interactions of the user at multiple time points within the media items provided by the media providing service.

The model is (514) a partially observable decision processes model.

SYSTEM AND METHOD FOR GENERATING MODELS REPRESENTING USERS OF A MEDIA PROVIDING SERVICE

TECHNICAL FIELD

The disclosed embodiments relate generally to media recommender systems, and, in particular, to providing a media item to a user based on an evaluation of predicted latent preferences of the user against historical data.

BACKGROUND

Recent years have shown a remarkable growth in consumption of digital goods such as digital music, movies and books among many others. The overwhelmingly large number of these goods often makes the choice of consumers an extremely difficult task. To cope with the constantly growing complexity of making such a choice the users typically rely on recommender systems (RS). These systems are based on advanced statistical techniques that for each user allow to identify a small subset of relevant items based on consumption choices of similar users. Not surprisingly, a number of platforms that distribute digital goods are built around such recommender systems.

SUMMARY

While many recommendation techniques ultimately produce rankings of the goods in a way that correlate with the users' preferences, they are not immediately helpful to quantify how much interest a particular user has for certain individual good such as a particular movie or a certain musical track. Quantifying these interests can allow to better understand the trade-offs faced by the users and, therefore, to simulate the users. Such simulations make it possible to test a number of recommendation policies offline using simulated users, e.g., before running costly AB tests. In addition to that, they can allow for enhanced experimentation with novel reinforcement learning based recommendation strategies.

In the disclosed embodiments, systems and methods are provided for evaluating (e.g., quantifying) the interests of users for different goods available on a platform (e.g., a streaming media service) by inspecting the choices the users make when consuming those goods. In some embodiments, the approach is applied to sequential music recommender, however, the approach can be applied more broadly to other similar domains (such as videos or news recommendations).

Some embodiments of the present disclosure model the interests of users involved in sequential decision making. One way to do this is by examining the choices the users make when interacting with the platform. It is reasonable to assume that these choices are not completely random; indeed users likely behave in a way that allows them to get the most valuable experience from their listening sessions. Consequently, they decide whether they would like to listen to one or another track in a way that optimizes the total interest they can get from their listening experience. These decisions are based on the trade-offs between the interest the users get from listening to the music and the opportunity cost of doing something else with their leisure time. The RS typically does not know the interests and the opportunity costs of the users. Instead, it can only observe the actual actions taken by the users. Thus, the RS can try to infer the original interests and preferences for alternative options (e.g., opportunity costs) that most likely explain the actions taken by the users.

In some embodiments, the user is modelled as a Partially Observable Markov Decision Process with interests and opportunity costs being parameters of the model. We demonstrate how we can infer the parameters of the user model in an iterative Monte-Carlo Expectation Maximization procedure.

In accordance with some embodiments, a method is provided. The method includes receiving historical data for a user of a media providing service, the historical data indicating past interactions of the user with media items provided by the media providing service. In some embodiments, the method includes generating a model of the user. The model includes a first set of parameters, each of the first set of parameters quantifying a predicted latent preference of the user for a respective media item provided by the media providing service. Generating a model of the user includes evaluating the predicted latent preferences of the user for the respective media items against the historical data indicating the past interactions of the user with the media items provided by the media providing service. In some embodiments, the method includes selecting a recommender system from a plurality of recommender systems using the model of the user, including the first set of parameters. In some embodiments, the method includes providing a media item to a second user using the selected recommender system.

In accordance with some embodiments, a computer system is provided. The computer system includes one or more processors and memory storing one or more programs. The one or more programs include instructions for receiving historical data for a user of a media providing service. The historical data indicates past interactions of the user with media items provided by the media providing service. The one or more programs include instructions generating a model of the user. The model comprises a first set of parameters. Each of the first set of parameters quantifies a predicted latent preference of the user for a respective media item provided by the media providing service. The generating includes evaluating the predicted latent preferences of the user for the respective media items against the historical data indicating the past interactions of the user with the media items provided by the media providing service. The one or more programs further include instructions for selecting a recommender system from a plurality of recommender systems using the model of the user, including the first set of parameters. The one or more programs further include instructions for providing a media item to a second user using the selected recommender system.

In accordance with some embodiments, a non-transitory computer-readable storage medium is provided. The non-transitory computer-readable storage medium stores one or more programs for execution by a computer system with one or more processors. The one or more programs comprising instructions for receiving historical data for a user of a media providing service. The historical data indicates past interactions of the user with media items provided by the media providing service. The one or more programs comprising instructions for generating a model of the user. The model comprises a first set of parameters. Each of the first set of parameters quantifies a predicted latent preference of the user for a respective media item provided by the media providing service. The generating includes evaluating the predicted latent preferences of the user for the respective media items against the historical data indicating the past interactions of the user with the media items provided by the media providing service. The one or more programs comprising instructions for selecting a recommender system from a plurality of recommender systems using the model of the user, including the first set of parameters. The one or more programs comprising instructions for providing a media item to a second user using the selected recommender system.

Thus, systems are provided with improved methods for generating models representing users of a media providing service.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 5A-5B are flow diagrams illustrating a method generating models representing users of a media providing service, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
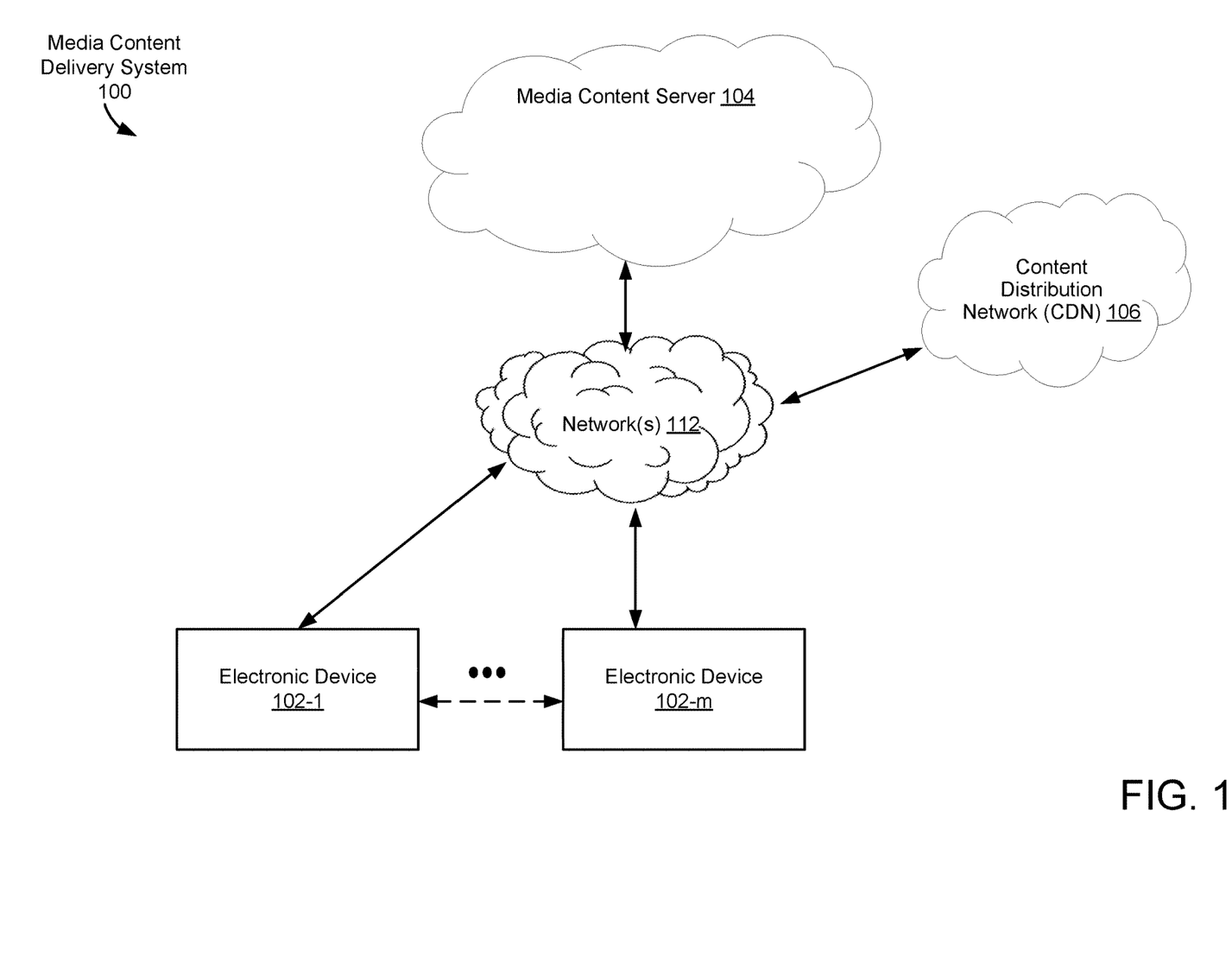
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-m, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, digital media player, a speaker, television (TV), digital versatile disk (DVD) player, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, an electronic device 102 is a headless client. In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices.

In some embodiments, electronic devices 102-1 and 102-m send and receive media-control information through network(s) 112. For example, electronic devices 102-1 and 102-m send media control requests (e.g., requests to play music, movies, videos, or other media items, or playlists thereof) to media content server 104 through network(s) 112. Additionally, electronic devices 102-1 and 102-m, in some embodiments, also send indications of media content items to media content server 104 through network(s) 112. In some embodiments, the media content items are uploaded to electronic devices 102-1 and 102-m before the electronic devices forward the media content items to media content server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-m. In some embodiments, electronic device 102-1 communicates with electronic device 102-m through network(s) 112. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a media application 222 (FIG. 2) that allows a respective user of the respective electronic device to upload (e.g., to media content server 104), browse, request (e.g., for playback at the electronic device 102), and/or present media content (e.g., control playback of music tracks, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API, a connect API, and/or key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
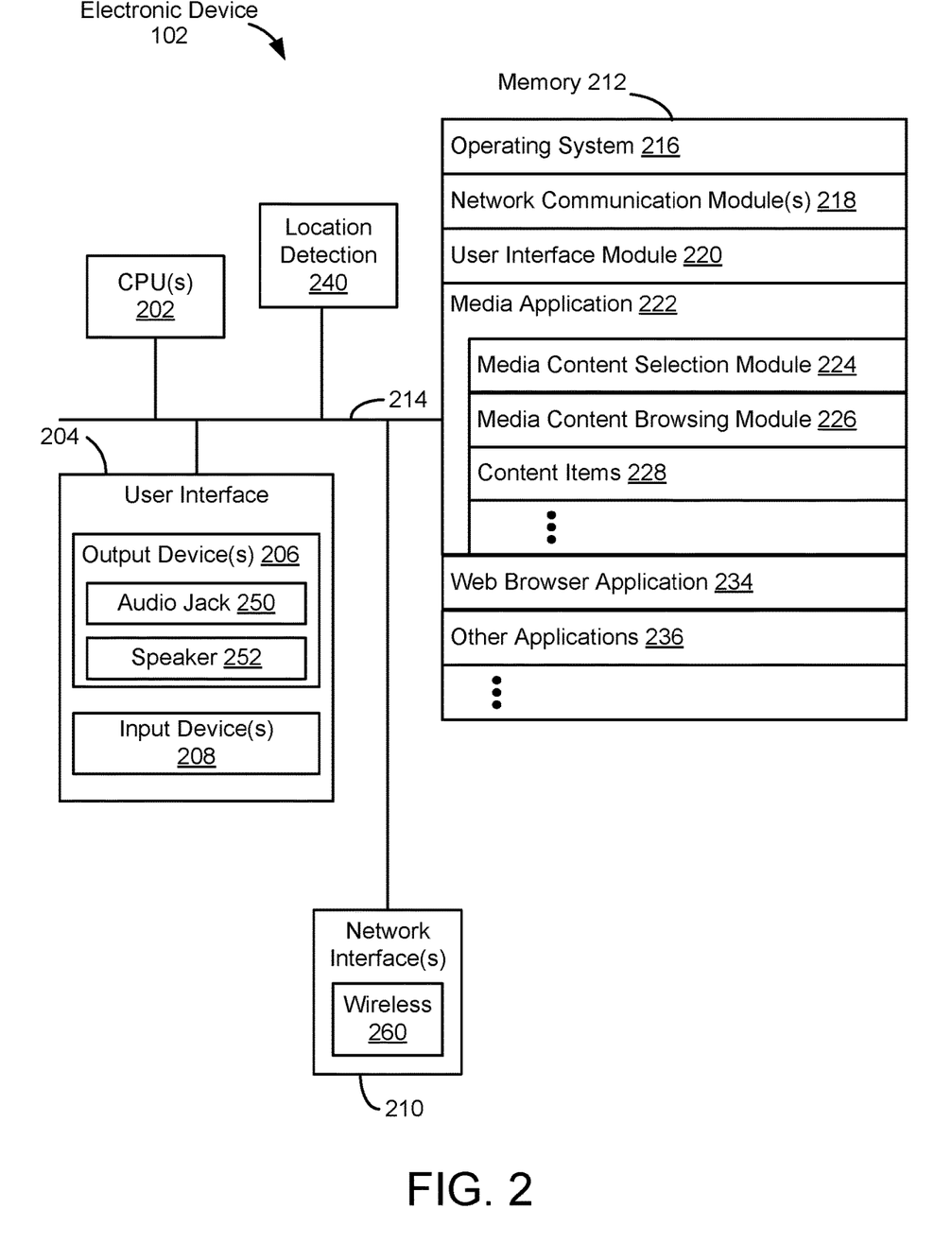
FIG. 2 is a block diagram illustrating an electronic device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems 108, and/or or other wireless (e.g., Bluetooth-compatible) devices (e.g., for streaming audio data to the media presentations system 108 of an automobile). Furthermore, in some embodiments, the wireless interface 260 (or a different communications interface of the one or more network interfaces 210) enables data communications with other WLAN-compatible devices (e.g., a media presentations system 108) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:
- an operating system 216 that includes procedures for handling various basic system services and for performing hardware-dependent tasks;
- network communication module(s) 218 for connecting the client device 102 to other computing devices (e.g., media presentation system(s) 108, media content server 104, and/or other client devices) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:
  - a media content selection module 224 for selecting one or more media content items and/or sending, to the media content server, an indication of the selected media content item(s);
  - a media content browsing module 226 for providing controls and/or user interfaces enabling a user to navigate, select for playback, and otherwise control or interact with media content, whether the media content is stored or played locally or remotely;
  - a content items module 228 for storing media items for playback and/or for forwarding requests for media content items to the media content server;
- a web browser application 234 for accessing, viewing, and interacting with web sites; and
- other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
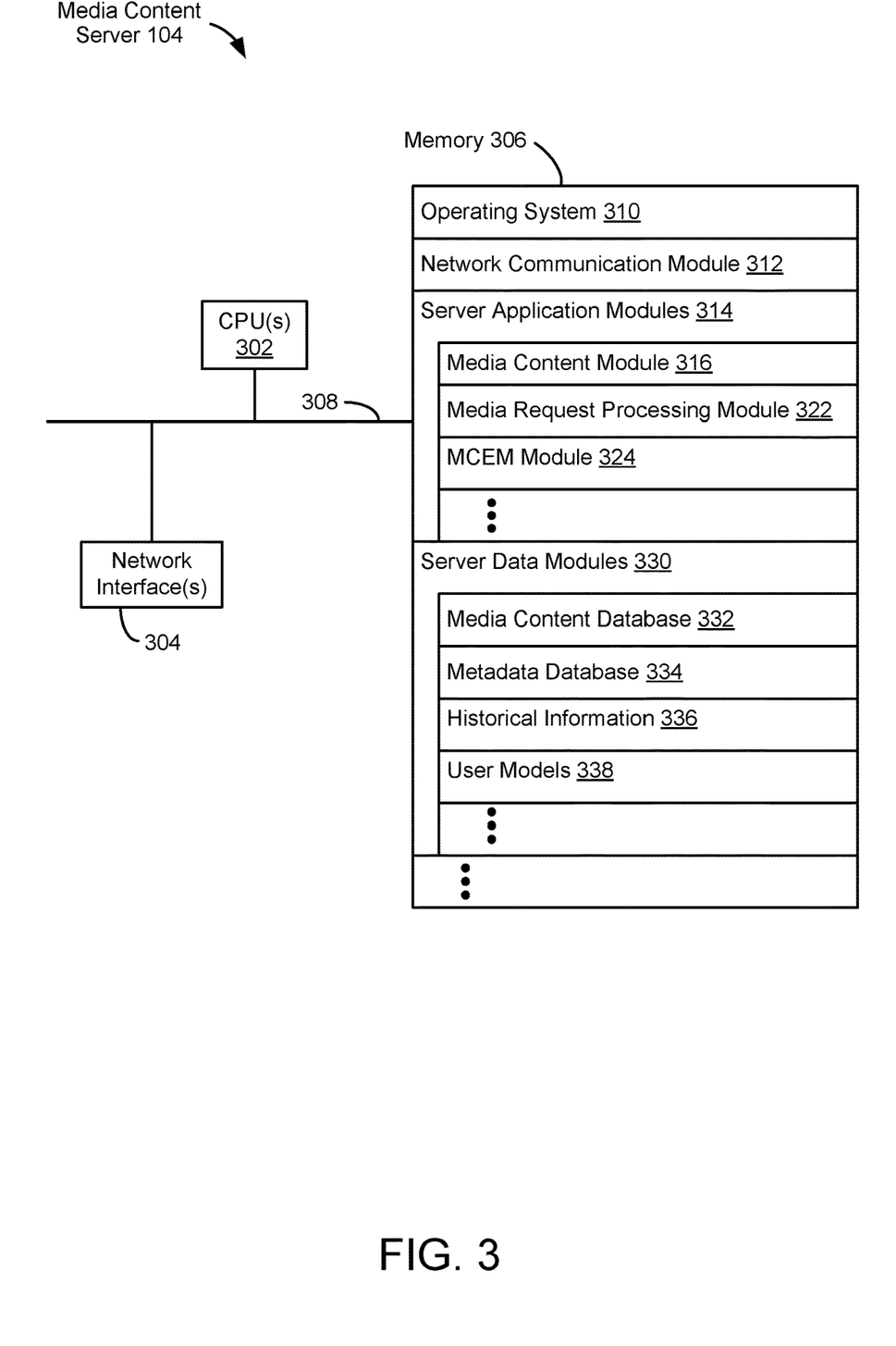
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:
- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:
  - a media content module 316 for storing one or more media content items and/or sending (e.g., streaming), to the electronic device, one or more requested media content item(s), including but not limited to, one or more of:
  - a media request processing module 322 for processing requests for media content and facilitating access to requested media items by client devices (e.g., the client device 102) including, optionally, streaming media content to such devices and/or to one or more media presentation system(s) 108;

a multi-arm bandit model 324 for calculating and/or updating a probability function based on objectives and context, and instructing media content selection module 224 to select a particular arm for each round;

one or more server data module(s) 330 for handling the storage of and/or access to media items and/or metadata relating to the media items; in some embodiments, the one or more server data module(s) 330 include:

a media content database 332 for storing media items;

a metadata database 334 for storing metadata relating to the media items; and historical information 336 for logging all sessions compiled for each of a plurality of users and the actions taken by the users listening to those sessions.

User models 338 storing, for each of a plurality of users, predicted preferences of the users for various media items offered by the streaming media service.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Formal Model

In this section, we provide a model of the user who sequentially listens to a particular playlist. We model the user as a Partially Observable Markov Decision Process (POMDP). We start with defining the user's preferences and describe the sequential structure of the problem. We then specify the action and the state spaces, the transitions between the states and the rewards. Although the formal model is described below with reference to music tracks, one of skill in the art having the benefit of this disclosure will recognize that the embodiments described herein are applicable to many types of media content items, including videos, podcasts, and the like.

Preference Scores. Let us consider a single user who regularly interacts with the given playlist of a fixed length $T \in \mathbb{N}$. Here, we define the playlist to be a sequence of distinct music tracks. In this disclosure, we focus on personalized playlists, e.g., playlists that the RS compiles for the user on a regular (e.g., weekly) basis. The length of the playlist is equal to the number of tracks in the playlist.

We assume that if we asked the user to sort all available music tracks into $K \in \mathbb{N}$ different bins (labeled from 1 to K) according to the user's preferences, the user would be capable of doing so. Here, the bin with the larger label corresponds to the more preferred content for the user. For example, if K=2, the first bin corresponds to the tracks that the user does not like, the second bin to the tracks that the user likes. This means that such a user would be indifferent between any two tracks associated with the same bin and would strictly prefer any track chosen from the bin with a larger label to any track chosen from the bin with a smaller label. We let $t \in \mathbb{N}$ denote a music track and let $\kappa_t \in \{1, \ldots, K\}$ be a discrete random variable indicating the label of the bin that the user associates with the track t. We refer to $\kappa_t$ as the true preference score of the user for the track t. For any tracks t and t' if the user weakly prefers t to t', then $\kappa_t \geq \kappa_{t'}$.

We assume that the RS tries to predict the preferences of the user and to rank tracks for the user according to their predicted preferences. Thus, we let $\tilde{\kappa}_t \in \{1, \ldots, K\}$ be a discrete random variable indicating the predicted preference score of the user for the track t. Observe, that while $\kappa_t$ and $\tilde{\kappa}_t$ can be correlated, they typically do not coincide. Furthermore, $\kappa_t$ is known to the user but not to the recommender system while $\tilde{\kappa}_t$ is known only to the RS but not to the user.

Listening Session. We consider a discrete time finite horizon model where the user can sequentially listen to T tracks of the given playlist starting with the track t=1 and finishing with the track t=T. Let $N \in \mathbb{N}$ be the total number of times the user has interacted with the playlist in the past. We assume that each time the user decides to interact with the playlist, the RS compiles a new sequence of tracks for the user and replaces the old tracks in the playlist with the new ones. Furthermore, we let $\kappa^{(i)} = (\kappa_1^{(i)}, \ldots, \kappa_T^{(i)})$ be the vector of realizations of the true preference scores of all tracks during the interaction $i \in \{1, \ldots, N\}$ of the user with the playlist. Similarly, let $\tilde{\kappa}^{(i)} = (\tilde{\kappa}_1^{(i)}, \ldots, \tilde{\kappa}_t^{(i)})$ be the vector of realized predicted preference scores of the respective tracks. Now, we can formally define the listening session i of the user as a sample $(\tilde{\kappa}^{(i)}, \kappa^{(i)})$ from the Hidden Markov Model (HMM) with $\tilde{\kappa}_t$ and $\kappa_t$, t=1, ..., T corresponding to the hidden and the observable-by-the-user variables respectively.

Figure 4A:
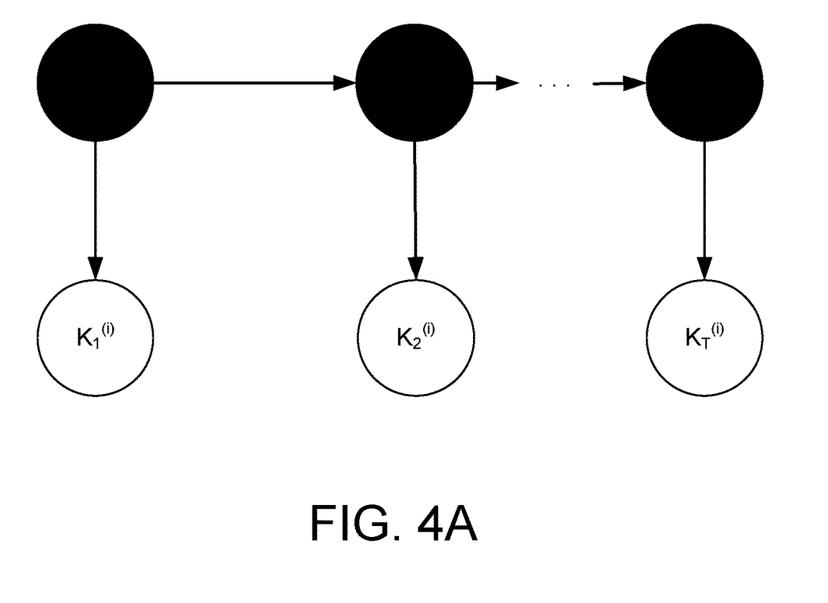
FIG. 4A-4B are plate diagrams illustrating various aspects of the disclosed embodiments.

FIG. 4A illustrates this idea. HMM defines the generative distribution for the listening sessions of the user. The shaded circles correspond to the unobservable-by-the-user predicted preference scores of each track in the playlist. The unshaded circles are the observable true preference scores of these tracks.

Assumption 1. For any listening session i=1, ..., N we have $\tilde{\kappa}_t^{(i)} \geq \tilde{\kappa}_{t+1}^{(i)}$ for all t=1, ..., T−1 (Equation 1). This assumption imposes constraints only on the predicted preference scores but not on the true ones. As the user's true preferences do not generally coincide with the predicted ones it is possible, for example, that the user prefers the later track to the earlier one. In other words, there may exist tracks t and t', t<t' such that $\kappa_{t'}^{(i)} > \kappa_t^{(i)}$.

Finally, we let $f_t(\kappa, \tilde{\kappa})$ be the joint distribution of the true and the predicted preference scores at the position $t \in \{1, \ldots, T\}$ of the playlist. We now assume that the user tries to "control" their listening sessions by taking different actions in a way that gives them the best listening experience.

Actions. We assume that when interacting with the playlist the user can decide whether they would like to listen (L) to the track t, to skip (S) it or to quit (Q) the listening session. Thus, we let at $a_t \in \{L, S, Q\}$ denote the action taken by the user for the track t. We let $a_t^{(i)}$ be the action taken by the user with respect to the track t in the listening session i. Furthermore, let $a^{(i)} = (a_1^{(i)}, \ldots, a_T^{(i)})$ be the action profile of the user in the listening session $i=1, \ldots, N$.

States. As mentioned, the user tries to "control" their session by choosing an appropriate action $a_t$ for each track t. First, observe that the user typically does not know their true preference score $\kappa_t$ for the track t before listening to the track. This follows from the fact that the track t can be unfamiliar to the user. However, the user still needs to take an action at regarding this track before they move to the next track t+1. Therefore, we assume that the user takes this action based on their presumptions regarding the track.

In particular, we assume that based on the previous N interactions with the playlist the user can form a presumption about how good the tracks are at different positions of the playlist. This can be achieved by estimating probabilities $Pr(\kappa_t)$, $t=1, \ldots, T$, as relative frequencies of having a track with the true preference score $\kappa_t = j$ on position t of the playlist:

$$Pr(\kappa_t = j) = \frac{1}{N} \sum_{i=1}^{N} \mathbb{1}\{\kappa_t^{(i)} = j\} \quad \text{Equation (2)}$$

for all $t=1, \ldots, T$, $j=1, \ldots, K$. (Here, $\mathbb{1}\{x=a\}$ is an indicator function that is equal to 1 if the condition $x=a$ is satisfied and equal to 0 otherwise). Similarly, the user can learn conditional probabilities $Pr(\kappa_{t+1}|\kappa_t)$ as relative frequencies of having tracks with the true preference score $\kappa_{t+1} = j$ on position t+1 of the playlist given the preceding track with the true preference score $\kappa_t = l$:

$$Pr(\kappa_{t+1} = j | \kappa_t = l) = \frac{1}{N} \frac{\sum_{i=1}^{N} \mathbb{1}\{\kappa_{t+1}^{(i)} = j, \kappa_t^{(i)} = l\}}{\sum_{i=1}^{N} \mathbb{1}\{\kappa_t^{(i)} = l\}} \quad \text{Equation (3)}$$

for all $t=1, \ldots, T-1$ and $j, l=1, \ldots, K$. We let B be the set of presumption states where each presumption state $s_t \in B$ corresponds to the probability distribution $Pr(\kappa_t)$ or $Pr(\kappa_t|\kappa_{t-1})$ that defines the presumptions of the user regarding track t. Importantly, the user reaches the presumption state $s_t \in B$ before choosing an action at for the track t.

Second, while the user may decide to listen to the next track before the track begins, skips most often occur when the track is already playing. Our empirical findings of the skipping behavior of users demonstrate that, when this happens, it is within 20-30 seconds after they start playing. Thus, we hypothesize that there is a short interval of time used by users to "sense" each track t. During this interval the user learns how much they like the track. In other words, the user learns their true preference score $\kappa_t$ for this track. Based on this information, the user can now decide whether they want to continue to listen to the track or not. We let $\delta \in (0,1)$ be the fraction of the track duration used by the user to learn $\kappa_t$ for this track. If, for example, a typical music track lasts for 5 minutes (i.e., 5×60 seconds), and the user needs 20 seconds to learn $\kappa_t$, then $$\delta = \frac{20}{5 \times 60} = \frac{1}{15}.$$

This discussion implies that in addition to the presumption states, the user also transitions through certainty states for which the uncertainty regarding $\kappa_t$ of the current track t is resolved. We let C be the set of certainty states, where $s_t \in C$ lies in the range $\{1, \ldots, K\}$ depending on the realization of the respective $\kappa_t$. Finally, the overall set of states S is the union of the presumption and the certainty states, i.e., $S = B \cup C$.

Figure 4B:
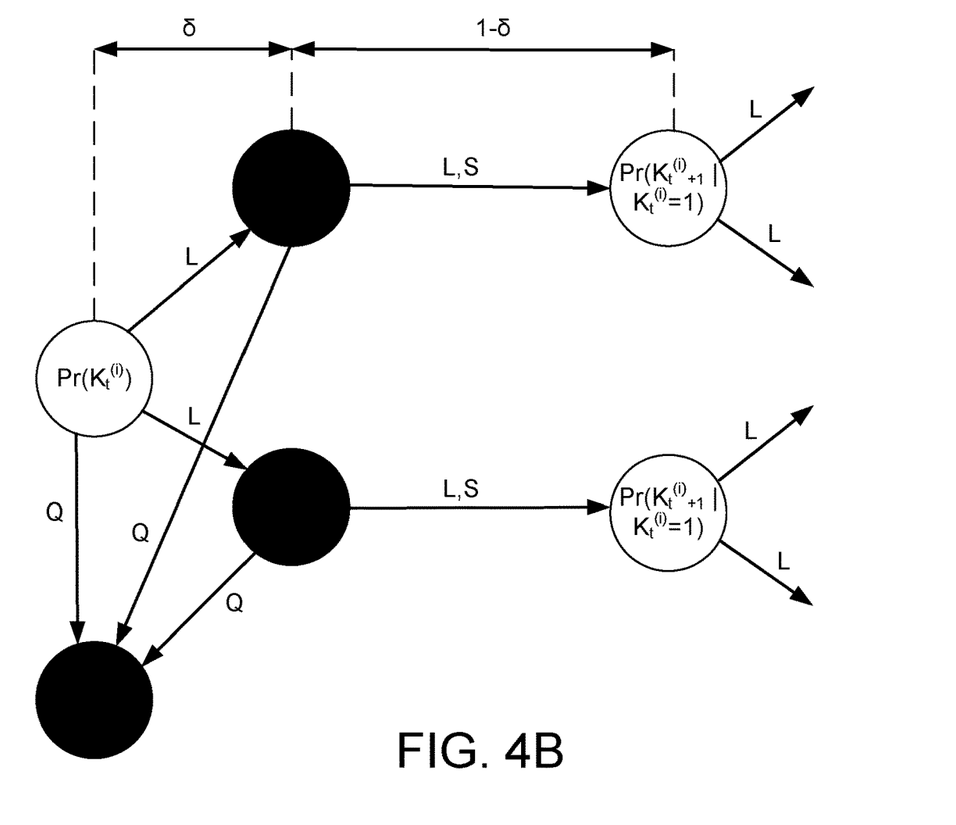

Transitions. FIG. 4B illustrates the overall decision process of the user when deciding on the action $a_t$ for the track t. Here, the nodes correspond to the states, and the edges correspond to the transitions between the states. We let $Pr(s_{t+1}|s_t, a_t)$ be the probability of transition from the state $s_t$ to the state $s_{t+1}$ if the user takes an action $a_t$ (here, $s_t, s_{t+1} \in S$). The labels above the edges correspond to the actions feasible in the respective states. The unshaded nodes in FIG. 4B correspond to the presumption states B and the shaded nodes correspond to the certainty states C. When the user is in the presumption state $s_t = Pr(\kappa_t) \in B$, they can decide to listen to the track t or to quit the session. This decision depends on the expected future reward they can gain given their actions and presumptions.

If the user decides to quit while being in the state $s_t \in B$, then they arrive to the terminal state with probability 1, i.e., Pr(Quit session $|s_t, Q) = 1$. If instead the user decides to listen, then after a small time interval $\delta \times$(track duration) the user learns their $\kappa_t$ for this track. This brings the user to one of K certainty states $s_t' \in C$ depending on the realization of $\kappa_t$. In particular, if the certainty state $s_t' \in C$ corresponds to the realized true preference score $\kappa_t = j$, then the transition probability $Pr(s_t'|s_t, L)$ is equal to $Pr(\kappa_t = j)$ according to the user's presumptions in the state $s_t \in B$. Now, the user can decide whether they would like to continue listening or whether they would prefer to skip the track or to quit. At this point, the user updates their presumption regarding the next track t+1 to $Pr(\kappa_{t+1}|\kappa_t = j)$. This new presumption corresponds to the new presumption state $s_{t+1} \in B$. If the user does not quit the session while being in the certainty state $s_t' \in C$, then they arrive to this new presumption state with probability 1, i.e., $Pr(s_{t+1}|s_t', a_t)$ for $a_t \in \{L, S\}$, $s_{t+1} \in B$, $s_t' \in C$. Otherwise, Pr(Quit session $|s_t', Q) = 1$. Finally, the user arrives to the next presumption state and the process repeats.

Rewards. We let $v(\kappa_t) \in [0, 1]$ be the interest that the user associates with any track t with the true preference score $\kappa_t \in \{1, \ldots, K\}$. We also let $c \in [0, 1]$ be the opportunity cost the user incurs when listening to any track. We assume that the user discounts the future with a constant discount rate $\gamma \in (0, 1)$. We can now define the user's reward in a state $s_t \in S$ given an action at as follows:

$$r(s_t, a_t) = \begin{cases} (v(\kappa_t) - c)\delta & \text{if } s_t \in C, a_t \in (S, Q), \\ (v(\kappa_t) - c)\delta + \gamma(1 - \delta)(v(\kappa_t) - c) & \text{if } s_t \in C, a_t = L \\ 0 & \text{otherwise} \end{cases} \quad \text{Eqn. (4)}$$

Observe, if the user is in the certainty state (i.e., $s_t \in C$), then they have already partially completed the track. In particular, they have already listened δ×(track duration) seconds of the track. This gives the user a partial reward of $(v(\kappa_t)-c)\delta$. Now, if the user in this state decides to skip the track or to quit, they cannot consume the rest of it. Consequently, their reward is $(v(\kappa_t)-c)\delta$. If, however, the user decides to keep listening to the track, then they can additionally consume $(1-\delta)\times$(track duration) seconds until the track completion. This increases their reward by $\gamma(1-\delta)(v(\kappa_t)-c)$. The reward of the user in any presumption state is zero as in these states the user does not consume tracks.

Now, let U: $S \to \mathbb{R}$ be the utility function of the user. We assume that the user maximizes their expected total discounted future reward. Consequently, the Bellman equation for such a user can be stated as follows:

$$U(s_t) = \max_{a_t}\left\{r(s_t, a_t) + \gamma \sum_{s' \in S} Pr(s'|s_t, a_t)U(s')\right\} \quad \text{Equation (5)}$$

Finally, we assume that while each user maximizes their expected future rewards, they can still make mistakes and deviate from the optimal policy by randomly choosing a suboptimal action for each track. We let $P_m \in [0, 1]$ be the probability that the user makes such a mistake.

Summary. The set of states S, transitions $Pr(s_{t+1}|s_t, a_t)$, actions $a_t$, rewards and the discount factory $\gamma$ define the decision process of the user listening to a specific playlist. If the RS knew the parameters of the user model, then it could easily simulate the user and predict their actions. However, the RS directly observes neither the presumptions nor the rewards of the user. Instead, it can only observe the playlists it has generated for the user and the actions taken by the user when listening to those playlists. Thus, it can try to infer the presumptions and the rewards that most likely explain these actions. In the following section, we demonstrate how this can be done.

Inference

Inference of the parameters of the user model introduced in the previous section can be performed in two steps. First, we show how the RS can learn the presumptions of the user. Equations (2) and (3) only suggest how the user can learn their own presumptions based on the observed true preference scores. However, the RS does not observe these scores as they are private knowledge of the user. This makes it infeasible for the RS to solely rely on Equations (2) and (3) to learn the user's presumptions. By imposing a mild assumption on the joint distribution $f_t(\kappa, \tilde{\kappa})$ we demonstrate how these presumptions can still be learned by the RS by performing an inference in the HMM (see FIG. 4A). We then provide a model that allows the RS to jointly learn the presumptions, the interests and the opportunity costs of the user in a Monte Carlo Expectation Maximization (MCEM) procedure.

Learning Presumptions of the User. To learn the presumptions of the user the RS would need to estimate $Pr(\kappa_{t+1}|\kappa_t)$ and $Pr(\kappa_t)$, see Equation (2) and (3). While the RS cannot observe $\kappa_t$ it can still observe the predicted scores $\tilde{\kappa}_t$. Consequently, it can estimate $Pr(\tilde{\kappa}_t)$ and $Pr(\tilde{\kappa}_{t+1}|\tilde{\kappa}_t)$ as relative frequencies of observing the predicted score $\tilde{\kappa}_t$:

$$Pr(\tilde{\kappa}_t = j) = \frac{1}{N}\sum_{i=1}^{N} \mathbb{1}\{\tilde{\kappa}_t^{(i)} = j\} \quad \text{Equation (6)}$$

$$Pr(\tilde{\kappa}_t = j | \tilde{\kappa}_{t-1} = l) = \frac{1}{N}\frac{\sum_{i=1}^{N} \mathbb{1}\{\tilde{\kappa}_t = j, \tilde{\kappa}_{t-1} = l\}}{\sum_{i=1}^{N} \mathbb{1}\{\tilde{\kappa}_{t-1} = l\}} \quad \text{Equation (7)}$$

Assume for now that the RS has access to the joint probability distribution $f_t(\kappa_t, \tilde{\kappa}_t)$ for all $t=1, \ldots, T$ (we discuss shortly how the RS can obtain this distribution). In this case, the RS can infer the presumptions of the user by performing an inference in the HMM (see FIG. 4A). Indeed, for all $i \in \{i, \ldots, K\}$ we have:

$$Pr(\kappa_{t+1}|\kappa_t = i) = \quad \text{Equation (8)}$$

$$\sum_{s=1}^{K}\frac{f_{t+1}(\kappa_{t+1}, s)}{Pr(\tilde{\kappa}_{t+1} = s)}\sum_{l=1}^{K}\frac{f_t(i, l)}{Pr(\tilde{\kappa}_t = l)}Pr(\tilde{\kappa}_{t+1} = s | \tilde{\kappa}_t = l)$$

Learning Interests and Opportunity Cost. In our setting, the training data corresponds to the predicted preference scores $\tilde{\kappa}^{(i)}$ and the actions $a^{(i)}$ taken by the user in each of their past listening sessions, $i=1, \ldots, N$. Formally, we let $D=\{(\tilde{\kappa}^{(i)}, a^{(i)})\}_{i=1}^{N}$ be the training data. Importantly, the training data is fully observable by the RS. In some embodiments, the RS logs all sessions compiled for each user and the actions taken by the users listening to those sessions.

By slightly overloading the notation, we let the interests $v(1), \ldots, v(K)$ and the opportunity cost c be unobservable by the RS independent random variables drawn from beta distributions:

$$v(i) \sim \text{Beta}(\alpha_i, \beta_i), i=1, \ldots, K \quad \text{Equation (9)}$$

$$c \sim \text{Beta}(\alpha_{K+1}, \beta_{K+1}) \quad \text{Equation (10)}$$

where $\alpha_i \in \mathbb{R}_{\geq 0}$ and $\beta_i \in \mathbb{R}_{\geq 0}$ are the parameters of the respective distributions, $i=1, \ldots, K+1$.

Notice, that if the predicted preference scores were perfectly correlated with the true preference scores of the user, then the joint distribution $f_t(\kappa_t, \tilde{\kappa}_t)$ could have been specified by a diagonal matrix with the marginal probabilities Pr $\tilde{\kappa}_t$ on its main diagonal, i.e., $$f_t(\kappa_t, \tilde{\kappa}_t) \sim \text{diag}[Pr(\tilde{\kappa}_t)], \forall t=1, \ldots, T \quad \text{Equation (11)}$$

However, in practice the RS does not have perfect knowledge of the true preferences of the user. This results in some noise in $f_t(\kappa_t, \tilde{\kappa}_t)$. We model this noise with a random variable $\epsilon$ drawn from a beta distribution with parameters $\alpha_{K+2}, \beta_{K+2} \in \mathbb{R}_{\geq 0}$ i.e., $$\epsilon \sim \text{Beta}(\alpha_{K+2}, \beta_{K+2}) \quad \text{Equation (12)}$$

Importantly, we assume that $\epsilon$ is independent of c and of all $v(i), i=1, \ldots, K$. Thus, the joint distribution $f_t(\kappa_t, \tilde{\kappa}_t)$ can be modeled as follows:

$$f_t(\kappa_t, \tilde{\kappa}_t) \sim \text{diag}[Pr(\tilde{\kappa}_t)] + \epsilon, \forall t=1, \ldots, T \quad \text{Equation (13)}$$

E-Step. To perform the first step of MCEM we need to estimate the posterior distribution $Pr(Z|D, \theta^{old})$ of the latent factors Z given data D and the current model parameters $\theta^{old}$. Applying Bayes rule to the posterior and assuming a uniform prior over $\theta^{old}$ we obtain:

$$Pr(Z|D, \theta^{old}) \sim Pr(D|Z)Pr(Z|\theta^{old}) \quad \text{Equation (14)}$$

Since $v(1), \ldots, v(K)$, c and E are assumed to be independent, the second term in Equation (14) can be expressed as follows:

$$Pr(Z \mid \theta^{old}) = \prod_{i=1}^{K+2} \text{Beta}(z_i; \alpha_i, \beta_i) \qquad \text{Equation (15)}$$

where $z_i$ corresponds to v(i) for i=1, . . . , K and to c and $\epsilon$ if i=K+1; K+2 respectively.

Now, to fully specify the posterior in Equation (14) we only need to estimate the likelihood Pr(D|Z). One can show that this likelihood can be expressed as follows:

$$Pr(D \mid Z) = \prod_{i=1}^{N} \sum_\kappa Pr(a^{(i)} \mid \kappa^{(i)}, Z) \prod_t f_t(\kappa_t^{(i)}, \tilde{\kappa}_t^{(i)}) \qquad \text{Equation (16)}$$

Intuitively, for each session i∈{1, . . . , N} the likelihood of this session is equal to the probability to observe the actions profile $a^{(i)}$ given the true preference scores $\kappa^{(i)}$ and given the model of the user Z (i.e., the interests, the opportunity cost and the noise parameter for the user). To estimate the probability $Pr(a^{(i)} \mid \kappa^{(i)}, Z)$ we simulate the user with the interests and opportunity cost defined by Z. We let the user interact with the listening session with the true preference scores $\kappa^{(i)}$ by solving Equation (5). Practically, this can be done by (approximate) interest iteration. This produces an optimal policy a*. We then estimate the probability to have the action profile $a^{(i)}$ given the optimal policy a* and given the probability $P_m$ that the user deviates from the optimal policy:

$$Pr(a^{(i)} \mid \kappa^{(i)}, Z) = Pr(a^{(i)} \mid a^*) = \prod_{t=1}^{T} P_m^{a_t^{(i)} \neq a_t^*} \left(1 - P_m\right)^{a_t^{(i)} = a_t^*} \qquad \text{Equation (17)}$$

Finally, this probability is weighted by the probability to observe the true preference scores given the predicted ones for the given session (the last term in Equation (16)).

M-Step. At this step, we estimate the new parameter $\theta^{new}$ that maximizes the expected log likelihood of observed and unobserved variables given the posterior $Pr(Z \mid D, \theta^{old})$:

$$\theta^{new} = \arg\max_\theta L(\theta, \theta^{old}), \qquad \text{Equation (18)}$$

where $$L(\theta, \theta^{old}) = \int_Z Pr(Z \mid D, \theta^{old}) \ln Pr(D, Z \mid \theta) dZ \qquad \text{Equation (19)}$$

Here, $$Pr(D, Z \mid \theta) = Pr(D, Z) Pr(Z \mid \theta) \qquad \text{Equation (20)}$$

The integration is performed over the continuous (K+2)-dimensional space Z. We estimate this integral by performing Monte Carlo sampling Z from the posterior $Pr(Z \mid D, \theta^{old})$.

TABLE 1

Overall Learning Procedure

Require: D, $P_m$, $\gamma$, $\epsilon_{tol}$, M, L
1:   $\theta^{new} \leftarrow (1, \ldots, 1) \in \mathbb{R}^{2(K+2)}$
2:   $\theta^{old} \leftarrow \theta^{new}$
3:   N ← |D|
4:   repeat
5:       Sample $Z_j \sim Pr(Z \mid D, \theta^{old})$, j = 1, . . . , M
6:       for all j = 1, . . . , M do TABLE 1-continued Overall Learning Procedure 7:           Instantiate user model using $Z_j$, $\gamma$, $P_m$
8:           for all i = 1, . . . , N do
9:               for all l = 1, . . . , L do
10:                  Sample $\kappa^{(i)} \sim U\{1, \ldots, K\}^T$
11:                  a* ← {Solve Problem 5 given $\kappa^{(i)}$}
12:                  Estimate $Pr(a^{(i)} \mid \kappa^{(i)}, Z)$ using Equation (17)
13:              end for
14:              Refine $Pr(D \mid Z_j)$ using Equation (16)
15:          end for
16:      end for
17:      Solve $\theta^{new} \leftarrow \arg\max_\theta$
             $L(\theta, \theta^{old})$ where $L(\theta, \theta^{old})$ is defined by Eqns. (19) and (20)
18:  until $\|\theta^{new} - \theta^{old}\| \geq \epsilon_{tol}$
19:  v(i) ← $\mathbb{E}[\text{Beta}(\theta_{2i-1}^{new}, \theta_{2i}^{new})]$ for all i = 1, . . . , K
20:  c ← $\mathbb{E}[\text{Beta}(\theta_{2K+1}^{new}, \theta_{2K+2}^{new})]$
21:  $\epsilon$ ← $\mathbb{E}[\text{Beta}(\theta_{2K+3}^{new}, \theta_{2K+4}^{new})]$
22:  return v(i), i = 1, . . . , K, c, $\epsilon$ Summary Algorithm 1 summarizes our approach. The algorithm takes the training data D, the probability to deviate from the optimal policy $P_m$, the discount factor $\gamma$, the tolerance parameter $\epsilon_{tol}$ and the numbers of samples M, L∈ ℕ N as inputs. Lines 1-2 initialize the parameters of the model. Lines 4-18 describe the iterative MCEM procedure. Each iteration begins with sampling M observations from the posterior $Pr(Z \mid D, \theta^{old})$ (see line 5). We rely on Metripolic-Hastings algorithm to perform such sampling. In lines 8-15, we estimate the likelihood $Pr(D \mid Z_j)$ using Equation (16). To achieve this we iterate in the outer loop (lines 8-15) over all N training samples D where each sample corresponds to the listening session ($\tilde{\kappa}(i), a^{(i)}$). The inner loop in lines 9-13 estimates $\Sigma_\kappa Pr(a^{(i)} \mid \kappa, Z)$ by simulating the sampled user. In Equation (16) the summation happens over all possible permutations of $\kappa$. We rely on sampling to estimate this likelihood (here, L is the number of samples used to estimate this term). The estimated likelihood is further used in line 17 to perform the maximization step of MCEM (see Equations (19) and (20)). Finally, lines 19-21 compute pointwise estimates of the interests, opportunity cost and the noise factors.

Figure 5B:
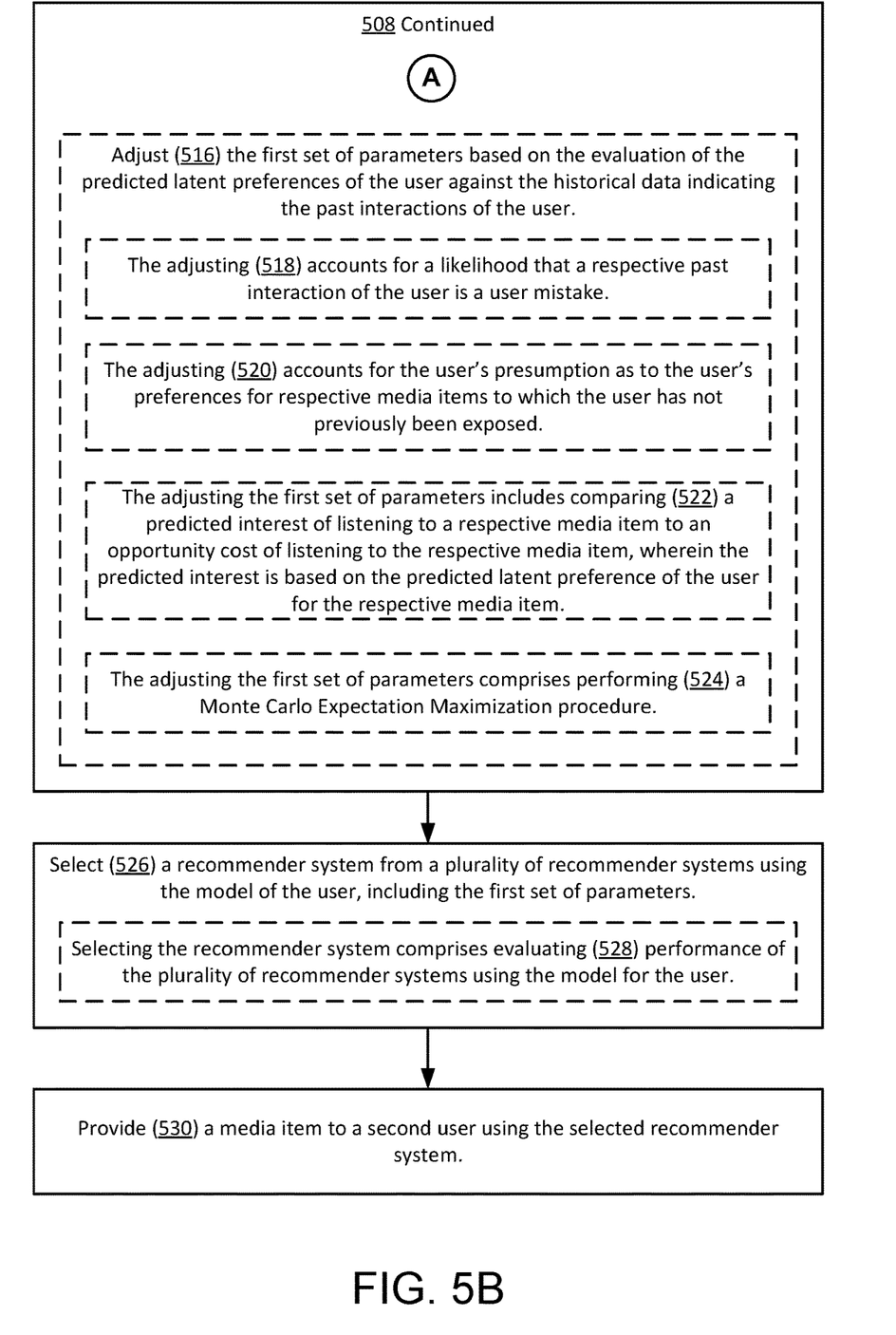

FIGS. 5A-5B are flow diagrams illustrating a method 500 of generating models representing users of a media providing service, in accordance with some embodiments. Method 500 may be performed at a server system (e.g., media content server 104) having one or more processors and memory storing instructions for execution by the one or more processors. In some embodiments, the method 500 is performed by executing instructions stored in the memory (e.g., memory 306, FIG. 3) of the server system. In some embodiments, the method 500 is performed by a combination of the server system (e.g., including media content server 104 and CDN 106) and an electronic device (e.g., a client device). In some embodiments, the server system provides tracks (e.g., media items) for playback to the electronic device(s) 102 of the media content delivery system 100.

Referring now to FIG. 5A, in performing the method 500, the method 500 includes receiving (502) historical data for a user of a media providing service. The historical data indicates past interactions of the user with media items provided by the media providing service (e.g., training data D={($\kappa^{(i)}, a^{(i)}$)}$_{i=1}^{N}$ described above). In some embodiments, the historical data includes (504) historical data for a plurality of listening sessions (e.g., listening sessions i=1, ..., N). In some embodiments, the past interactions of the user include (506) one or more interactions from the group consisting of: listening to a respective media item (L), skipping a respective media item (S), and ending a listening session (Q). In some embodiments, the server logs all sessions compiled for each user and the actions taken by the users listening to those sessions.

In some embodiments, after receiving (502) historical data, the method 500 includes generating (508) a model of the user (e.g., model Z, generated using the inference process described above). In some embodiments, the model includes a first set of parameters (e.g., predicted preference scores $\tilde{\kappa}_t \in \{1, \ldots, K\}$), each of the first set of parameters quantifying a predicted latent preference of the user for a respective media item provided by the media providing service. In some embodiments, the generating includes evaluating the predicted latent preferences of the user for the respective media items against the historical data indicating the past interactions of the user with the media items provided by the media providing service (e.g., using the inference process described above).

In some embodiments, evaluating the predicted latent preferences of the user against the historical data indicating past interactions of the user includes retrospectively predicting (510) the past interactions of the user using the predicted latent preferences and comparing the retrospectively predicted past interactions of the user to the historical data indicating the past interactions of the user (e.g., the inner loop in lines 9-13 of Table 1 estimates $\Sigma_\kappa \Pr(a^{(i)}|\kappa, Z)$ by simulating the sampled user). In some embodiments, retrospectively predicting the past interactions of the user includes retrospectively predicting (512) the past interactions of the user at multiple time points within the media items provided by the media providing service (e.g., at the start of a track and at a time $\delta$ after the start of the track). In some embodiments, the model is (514) a partially observable decision processes model.

In some embodiments, and turning to FIG. 5B, operation 508 includes adjusting (516) the first set of parameters based on the evaluation of the predicted latent preferences of the user against the historical data indicating the past interactions of the user (e.g., lines 4-18 of Table 1 describe an iterative MCEM procedure in which the user preferences $\kappa_t$ are updated).

In some embodiments, the adjusting (518) accounts for a likelihood that a respective past interaction of the user is a user mistake (e.g., the process outlined in Table 1 provides for a probability $P_m \in [0, 1]$ that the user devices from the optimal policy by randomly choosing a suboptimal action for each track). In some embodiments, the adjusting (520) accounts for the user's presumption as to the user's preferences for preferences for respective media items to which the user has not previously been exposed (e.g., the user transitions through uncertainty states $s_t \in C$ in which the user is learning their preference for a track).

In some embodiments, adjusting (516) the first set of parameters includes comparing (522) a predicted interest of listening to a respective media item to an opportunity cost of listening to the respective media item (e.g., the model establishes a reward for the user in a particular state that includes the interest of listening to a track and the opportunity cost for listening to the track, as shown in Equation 4). In some embodiments, the predicted interest is based on the predicted latent preference of the user for the respective media item (e.g., as shown in Equation 4). In some embodiments, the adjusting (516) the first set of parameters further includes performing (524) a Monte Carlo Expectation Maximization procedure. In some embodiments, the predicted interest is a quantified value for the predicted interest. In some embodiments, the opportunity cost is a quantified value for the opportunity cost.

In some embodiments, operation 508 also includes generating a respective model for each respective user of a plurality of users (e.g., the process shown in Table 1 is performed for a plurality of users). In some embodiments, the model for each respective user quantifies predicted latent preferences of the respective user for the media items provided by the media providing service.

After performing operation 508, the method 500 includes selecting (526) a recommender system from a plurality of recommender systems using the model of the user, including the first set of parameters. In some embodiments, selecting the recommender system includes evaluating (528) performance of the plurality of recommender systems using the model for the user. In some embodiments, the evaluation of the performance of the plurality of recommender systems is performed using the models for the plurality of users. In some embodiments, the evaluation of the performance of the recommender system includes simulating listening sessions using the models of the plurality of users and comparing outcomes, such as durations of the listening sessions (e.g., how many tracks a simulated user listened to before reaching the quit session state (Q)). Such simulations make it possible to test a number of recommendation policies (e.g., recommender systems) offline using simulated users, e.g., before running costly AB tests.

In some embodiments, method 500 includes providing (530) a media item to a second user using the selected recommender system. For example, the recommender system (e.g., recommender policy) selected using the plurality of simulated users may be used to provide recommendations to other users that were not simulated.

Although FIGS. 5A-5B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
    receiving historical data for a user of a media providing service, the historical data indicating past interactions of the user with media items provided by the media providing service;
    generating a model of the user, the model comprising a first set of parameters, each of the first set of parameters quantifying a predicted latent preference of the user for a respective media item provided by the media providing service, the generating including evaluating the predicted latent preferences of the user for the respective media items against the historical data indicating the past interactions of the user with the media items provided by the media providing service;

selecting a recommender system from a plurality of recommender systems using the model of the user by simulating user interactions with a sequence of media items provided by the recommender system, including the first set of parameters; and providing a media item to a second user using the selected recommender system.

2. The method of claim 1, wherein evaluating the predicted latent preferences of the user against the historical data indicating the past interactions of the user comprises retrospectively predicting the past interactions of the user using the predicted latent preferences and comparing the retrospectively predicted past interactions of the user to the historical data indicating the past interactions of the user.

3. The method of claim 2, wherein retrospectively predicting the past interactions of the user comprises retrospectively predicting the past interactions of the user at multiple time points within the media items provided by the media providing service.

4. The method of claim 1, further comprising adjusting the first set of parameters based on the evaluation of the predicted latent preferences of the user against the historical data indicating the past interactions of the user.

5. The method of claim 4, wherein the adjusting accounts for a likelihood that a respective past interaction of the user is a user mistake.

6. The method of claim 4, wherein the adjusting accounts for a presumption as to a preferences of the user for respective media items to which the user has not previously been exposed.

7. The method of claim 4, wherein adjusting the first set of parameters includes comparing a predicted interest of listening to a respective media item to an opportunity cost of listening to the respective media item, wherein the predicted interest is based on the predicted latent preference of the user for the respective media item.

8. The method of claim 4, wherein adjusting the first set of parameters comprises performing a Monte Carlo Expectation Maximization procedure.

9. The method of claim 1, wherein the past interactions of the user comprise one or more interactions from the group consisting of: listening to a respective media item, skipping a respective media item, and ending a listening session.

10. The method of claim 1, wherein the historical data comprises historical data for a plurality of listening sessions.

11. The method of claim 1, further comprising generating a respective model for each respective user of a plurality of users, the model for each respective user quantifying predicted latent preferences of the respective user for the media items provided by the media providing service.

12. The method of claim 1, wherein the model is a partially observable Markov decision processes model.

13. The method of claim 1, wherein selecting the recommender system comprises evaluating performance of the plurality of recommender systems using the model for the user.

14. The method of claim 1, wherein the simulated user interactions with the sequence of media items comprise one or more interactions from the group consisting of: listening to a respective media item, skipping a respective media item, and quitting a listening session.

15. A computer system, comprising:

one or more processors; and memory storing one or more programs, the one or more programs including instructions for:

receiving historical data for a user of a media providing service, the historical data indicating past interactions of the user with media items provided by the media providing service;

generating a model of the user, the model comprising a first set of parameters, each of the first set of parameters quantifying a predicted latent preference of the user for a respective media item provided by the media providing service, the generating including evaluating the predicted latent preferences of the user for the respective media items against the historical data indicating the past interactions of the user with the media items provided by the media providing service;

selecting a recommender system from a plurality of recommender systems using the model of the user by simulating user interactions with a sequence of media items provided by the recommender system, including the first set of parameters; and providing a media item to a second user using the selected recommender system.

16. A non-transitory computer-readable storage medium storing one or more programs for execution by a computer system with one or more processors, the one or more programs comprising instructions for:

receiving historical data for a user of a media providing service, the historical data indicating past interactions of the user with media items provided by the media providing service;

generating a model of the user, the model comprising a first set of parameters, each of the first set of parameters quantifying a predicted latent preference of the user for a respective media item provided by the media providing service, the generating including evaluating the predicted latent preferences of the user for the respective media items against the historical data indicating the past interactions of the user with the media items provided by the media providing service;

selecting a recommender system from a plurality of recommender systems using the model of the user by simulating user interactions with a sequence of media items provided by the recommender system, including the first set of parameters; and providing a media item to a second user using the selected recommender system.

* * * * *